United States Patent [19]

Okumura et al.

[11] Patent Number: 5,696,689
[45] Date of Patent: Dec. 9, 1997

[54] DISPATCH AND CONVEYER CONTROL SYSTEM FOR A PRODUCTION CONTROL SYSTEM OF A SEMICONDUCTOR SUBSTRATE

[75] Inventors: Toshihiro Okumura, Nukata-gun; Junji Ikeda, Kariya, both of Japan

[73] Assignee: Nippondenso Co., Ltd., Kariya, Japan

[21] Appl. No.: 562,824

[22] Filed: Nov. 27, 1995

[30] Foreign Application Priority Data

Nov. 25, 1994 [JP] Japan .................... 6-315590
Apr. 18, 1995 [JP] Japan .................... 7-117921

[51] Int. Cl.[6] .............. G06F 19/00; B65G 49/07; B65G 37/00
[52] U.S. Cl. ............... 364/468.28; 414/935; 414/940; 198/347.1; 198/576
[58] Field of Search ............... 364/468.28, 402, 364/401, 156; 414/273, 935–941, 286; 395/22; 104/88; 198/460, 572, 575, 576, 577, 578, 347.1, 347.4, 349.1

[56] References Cited

U.S. PATENT DOCUMENTS

| | | | |
|---|---|---|---|
| 4,648,023 | 3/1987 | Powell | 364/156 |
| 4,926,753 | 5/1990 | Weiss | 104/88 |
| 5,172,313 | 12/1992 | Schumacher | 364/401 |
| 5,291,397 | 3/1994 | Powell | 364/402 |
| 5,295,065 | 3/1994 | Chapman et al. | 364/401 |
| 5,442,730 | 8/1995 | Bigus | 395/22 |
| 5,536,128 | 7/1996 | Shimoyashiro et al. | 414/273 |

FOREIGN PATENT DOCUMENTS

| | | |
|---|---|---|
| 3-19754 | 1/1991 | Japan . |
| 4-129653 | 4/1992 | Japan . |
| 4-176548 | 6/1992 | Japan . |
| 5-197403 | 8/1993 | Japan . |
| 5-250010 | 9/1993 | Japan . |

Primary Examiner—Reba I. Elmore
Assistant Examiner—Thomas E. Brown
Attorney, Agent, or Firm—Cushman, Darby & Cushman IP Group of Pillsbury Madison & Sutro LLP

[57] ABSTRACT

A semiconductor substrate production control system controlling the production of semiconductor substrates grouped as lots so that a delay of each lot between processing operations does not exceed a time limit within which the amount of deterioration of the substrates exceeds permissible levels when plural types and plural lots of semiconductor substrates are arbitrarily provided in a process requiring consecutive processing operations. A first control unit controls the progress of production of the semiconductor substrates per lot and various processing equipment. Storage stations store the lots. First and second processing equipment implement predetermined processing operations on the lots, and a conveyer conveys the lots between the storage unit and the first and second processing equipment. A reserving unit calculates processing starting and ending times of the first and second processing equipment for each lot scheduled to be conveyed thereto so that the leave-over time of each lot, which is the time during which the lots are between processing operations, is kept within a predetermined time limit so that an amount of deterioration of the lot is within permissible levels. Finally, a setting unit sets the processing conditions for the first and second processing equipment.

26 Claims, 6 Drawing Sheets

DISPATCH AND CONVEYER CONTROL SYSTEM FOR A PRODUCTION CONTROL SYSTEM OF A SEMICONDUCTOR SUBSTRATE

CROSS REFERENCE TO RELATED APPLICATION

This application is based upon and claims the benefit of priority of the prior Japanese Patent applications No. 6-315590 filed on Nov. 25, 1994 and No. 7-117921 filed on Apr. 18, 1995, the contents of which are incorporated herein by reference.

BACKGROUND OF THE INVENTION

1. Field of the Invention

The present invention relates to a production control system applied to a process for manufacturing semiconductor substrates, and more particularly, to a production control system for controlling a timing for engaging a semiconductor substrate in a process of consecutive works having a limit on a leave-over time between works and during which the deterioration of the semiconductor substrate may occur.

2. Related Arts

The process for manufacturing semiconductor substrates has been automated with the development of computers. Japanese Patent Laid-Open No. Hei. 4-270459, for example, describes a production control system applied to an automated production system. In the technology disclosed therein, a job priority calculator updates a priority of jobs dynamically in each equipment corresponding to a state of production at each point of time, i.e. implements dispatching, by taking into account the equipment operating state of the whole production system and the progress of jobs based on a production schedule and data of a state of production, such as work progress information and, when an equipment becomes idle, decides a next job to be processed at that equipment taking account the priority and a processing efficiency of the equipment.

However, the conventional dispatching device has had a problem in that it might cause a large volume of lots requiring consecutive works and having a limit on a leave-over time between works during which deterioration can occur, to be processed at the preceding work, exceeding a capacity of the post-process equipment, and thereby increase so much stock that the post-process equipment is unable to keep within the leave-over time. Due to that, the setting of the consecutive processes has been made manually, rather than by automated dispatching, in the past. However, manual operation has had a problem in terms of production efficiency that manual operation limits a plant from producing plural types and plural lots of semiconductor substrates, for example.

SUMMARY OF THE INVENTION

Accordingly, it is an object of the present invention to solve the aforementioned problem by providing a semiconductor substrate production control system which can control production efficiently, so that the time during which each lot is detained between works will not exceed a time limit within which the deterioration can occur when plural types and plural lots of semiconductor substrates are arbitrarily provided in a process requiring consecutive operations.

In order to achieve the aforementioned object, according to the present invention, a semiconductor substrate production control system having first controller governs the progress of production of plural types of semiconductor substrates per lot and various processing equipment. The controller comprises storage stations for storing the lots; at least one first processing equipment for implementing a predetermined process under processing conditions corresponding to the type of lot and at least one second processing equipment, for processing each processed lot in parallel based on the type of lot under processing conditions based on the type of each lot; and a conveyer for conveying lots from a first storage station to the first processing equipment, from the first processing equipment to the second processing equipment and from the second processing equipment wherein there exists a leave-over time limit during which deterioration of the lots can occur after the processing by the first processing equipment.

The first controller comprises a memory; processing condition setting unit for setting each processing condition of the first and second processing equipment corresponding based on the type of lot scheduled to be conveyed from the storage station to the first processing equipment; reserving unit calculating a scheduled processing starting time and a scheduled processing ending time of the first processing equipment and a scheduled processing starting time and a scheduled processing ending time of the second processing equipment per lot scheduled to be conveyed appropriately so that the leave-over time of each of the processed lot between processing operations is kept within the time limit based on at least a lot conveying time of the conveyer and a scheduled processing ending time of the second processing equipment previously calculated for a previous lot based on the processing conditions decided by the processing condition setting unit, and for storing this information in the memory as reservation information; and a conveyer controller for permitting the lots scheduled to be conveyed to be conveyed from the storage station to the first processing equipment and for controlling the conveying operation of the conveyer.

Therefore, according to the present invention, the processing condition setting unit sets the various processing conditions of the first and second processing equipment corresponding to the type of lot scheduled to be conveyed from the storage station to the first processing equipment. The calculating unit calculates the scheduled processing starting time and the scheduled processing ending time of the first processing equipment and the scheduled processing starting time and the scheduled processing ending time of the second processing equipment appropriately for each lot scheduled to be conveyed so that the permitted leave-over time between processing operations, which is determined based on the deterioration of the lots during this time period, is kept within a predetermined time limit, which is based on at least the time for conveying the lot by the conveyer, and the scheduled processing completing time of the second processing equipment based on the processing conditions decided by the processing condition setting unit, and stores this information in memory as reservation information. Then, the conveyer controller permits the lot scheduled to be conveyed to be conveyed from the storage station to the first processing equipment based on the reservation information stored in memory and controls the conveying operation of the conveyer. Thus, each lot scheduled to be conveyed is conveyed from the storage station to the second processing equipment via the first processing equipment.

Accordingly, even when plural types and plural lots of semiconductor substrates are arbitrarily provided to the processing apparatus, the production thereof may be controlled efficiently so that the retention of each lot between works will not exceed the time limit within which the amount of deterioration that occurs is maintained with permissible levels.

Further, the conveying operation of lots scheduled to be conveyed from the storage station to the first processing equipment may be adequately controlled by determining whether all of the lots are scheduled to be processed in the second processing equipment, so that more steady and efficient control can be realized.

It is noted that when the first processing equipment is replaced with cleaning equipment and the second processing equipment is a diffusion equipment, the flow of products in a diffusion process will become extremely efficient. The present invention also applies to a case wherein the first processing equipment is the cleaning equipment and the second processing equipment is a thin film deposition equipment.

Further, when the semiconductor substrate production control system constructed as described above is combined with an imaginary station, a third processing equipment, a second controller, and a host computer for monitoring the control states of the second and first controller and for controlling, corresponding to the control state, the lot conveying operation between the first processing equipment and the imaginary station and the lot conveying operation between the first processing equipment and the third processing equipment, the processing conditions may be set for each processing equipment based on the type of each processed lot even when each lot processed in the first processing equipment is conveyed next to the third processing equipment or when conveyed to the second processing equipment and the lot is conveyed to the first processing equipment so that the leave-over time within which the amount of deterioration of each processed lot is within permissible levels is kept within a desired time limit.

Similarly, the production thereof may be controlled efficiently so that the retention of each lot between works does not exceed the time limit within which the amount of deterioration is within permissible levels even when plural types and plural lots of semiconductor substrates are arbitrarily provided to the processor.

It is noted that when the third processing equipment is a vapor deposition equipment, the flow of products in a vapor deposition process will become extremely efficient.

Further, even when conveyed lots overlap each other at the first processing equipment, the lots can be processed without any trouble by setting a predetermined priority order for the lot scheduled to be conveyed to the second processing equipment and the lot scheduled to be conveyed to the third processing equipment.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

The present invention will be explained concretely below based on preferred embodiments thereof.

[First Embodiment]

Figure 1:
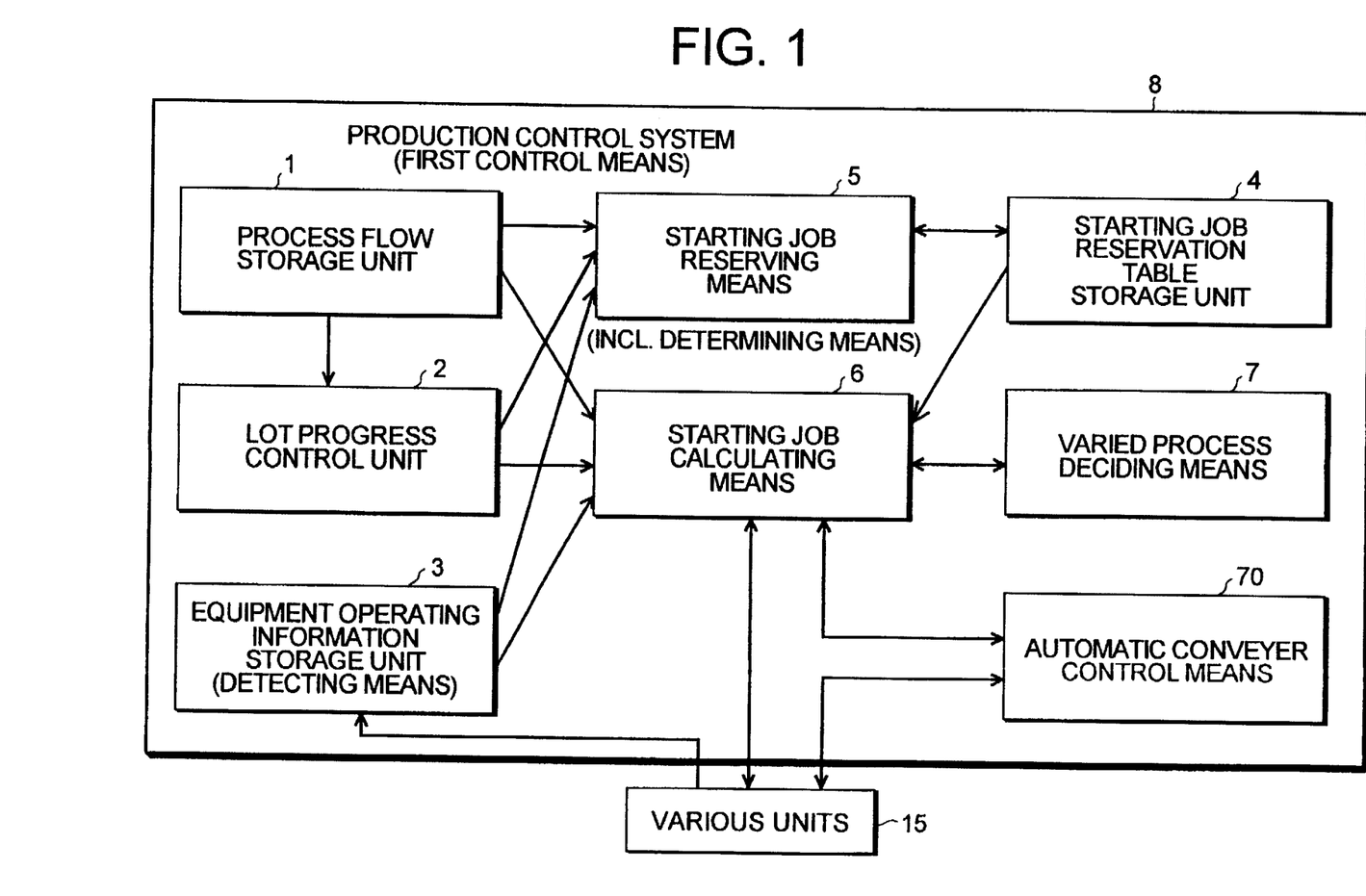
FIG. 1 is a block diagram of a production control system to which one preferred embodiment of the present invention is applied.

FIG. 1 is a structural block diagram for explaining a production control system (first controller) 8, in a semiconductor device production line, to which the present invention applies. The production control system 8 is a computer system.

The first controller 8 comprises a process flow storage unit 1 for storing process flow describing sequences, contents, conditions and the like of the work processes for producing plural types of products via a plurality of work processes; a lot progress control unit 2 for controlling the progress of the works based on the process flow; an equipment operating information storage unit 3 for storing information on a current operating state of each equipment, such as, for example, information indicating that a piece of equipment is under maintenance, is waiting to engage with a lot, or is out of order; varied processing condition setting unit 7 for setting the processing conditions of each equipment based on a type of product for each lot scheduled to arrive at each equipment; starting job reserving unit (reserving unit) 5 for determining whether a lot scheduled to arrive at each equipment is to be started, for calculating a starting time of the job to be started based on the processing conditions of each equipment decided by setting unit 7 and for writing the starting times as reservation information in a storage unit 4 for storing a starting job reservation table; starting job calculating unit 6 for starting a job based on the information in the starting job reservation table storage unit 4 at first, for giving, when there is no such information, a priority to a pre-engagement lot (a lot to be worked in an appropriate equipment, i.e. a lot scheduled to be conveyed) and for specifying the appropriate equipment among various equipment (a group of equipment used in each work) 15 to start the job and when there is a reservation, for calculating a start time to convey the pre-engagement lot into the equipment scheduled to engage with it based on the contents of the stored reservation; and automatic conveyer 70 for outputting a command to convey a lot to an automatic conveyer system (described later) based on the calculation result of the starting job calculating unit 6.

The process flow stored in the process flow storage unit 1 is decided by a scheduler or the like that sets a production schedule for the whole plant. The process flow contains information, such as a lot number of each product, names of necessary processes, the operations in each process, the equipment necessary for these operations and work recipes. Respective product lots are processed and manufactured in order by making reference to this information.

The process flow storage unit 1 also contains data indicative of a leave-over time limit between operations within which the amount of deterioration of the lot is within permitted levels, the time limit and whether the works have to be carried out consecutively (hereinafter referred to as consecutive works) or not. The consecutive works refer to a series of operations on a lot which always have to be carried out consecutively, such as a cleaning operation and a thermal oxidation operation in a diffusion process of semiconductor substrates and a cleaning operation and a film forming operation in a thin film forming (film deposition) process. Normally, there is a leave-over time limit within which the amount of deterioration is within permissible levels between operations in many cases if the operations are consecutive.

Based on the process flow data stored in the process flow storage unit 1, the lot progress control unit 2 operates the starting job reserving unit 5 at first and then decides a lot to be started by the starting job calculating unit 6. However, the decision of the job to be started is made by referring to the equipment operating information storage unit 3, which keeps records of each equipment, i.e., whether it is usable (capable of processing) or not and when it is usable, and the lot is decided to be started by that equipment. At this time, the varied processing condition setting unit 7 sets the processing conditions based on the type of lot to be started for that equipment.

As triggered by the arrival of a pre-engagement lot from a previous work station or by the lot progress control unit 2 when no trigger is generated, the starting job reserving unit 5 selects a pre-engagement lot belonging to any one of the equipment to determine whether that pre-engagement lot requires consecutive operations from now on. If the pre-engagement lot requires no consecutive works, starting job reserving unit 5 checks a following pre-engagement lot through the lot progress control unit 2 in the same manner. Similarly, it checks all the pre-engagement lots to determine whether they require consecutive works.

Assume that a pre-engagement lot, which is an object of the present discussion, requires consecutive works having a leave-over time limit intrinsic to that lot between works in the post process of that lot. In this case, a state of reservation of a target equipment group is checked by retrieving the starting job reservation table storage unit 4 concerning to an idle time of the target equipment. Then, the varied processing condition setting unit 7 sets the predetermined processing conditions corresponding to a type of lot for that pre-engagement lot and the target equipment group appropriately, and based on the processing conditions, the starting job reserving unit 5 decides an optimum starting time and writes it to the starting job reservation table storage unit 4 to update the reservation information. When this determination and reservation have been made for all the pre-engagement lots arriving at each equipment, the starting job reserving unit 5 is put into a standby state until the next arrival trigger is generated.

Figure 3A:
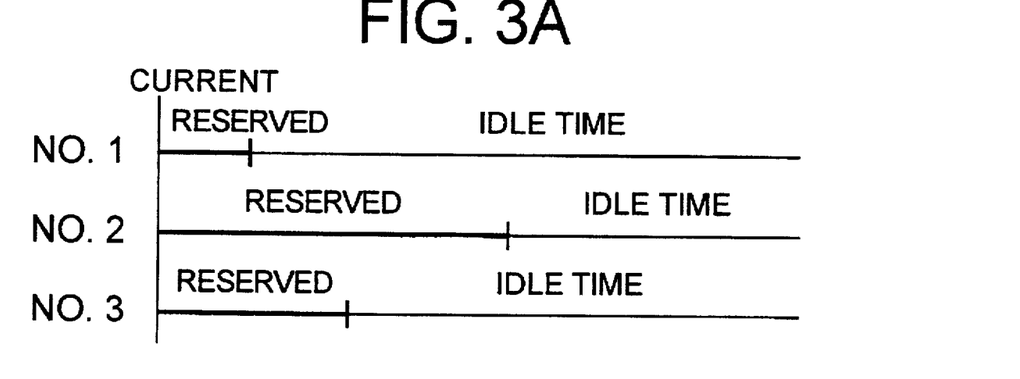
FIGS. 3A, 3B and 3C are diagrams for explaining reservations made by a starting job calculator.
Figure 3B:
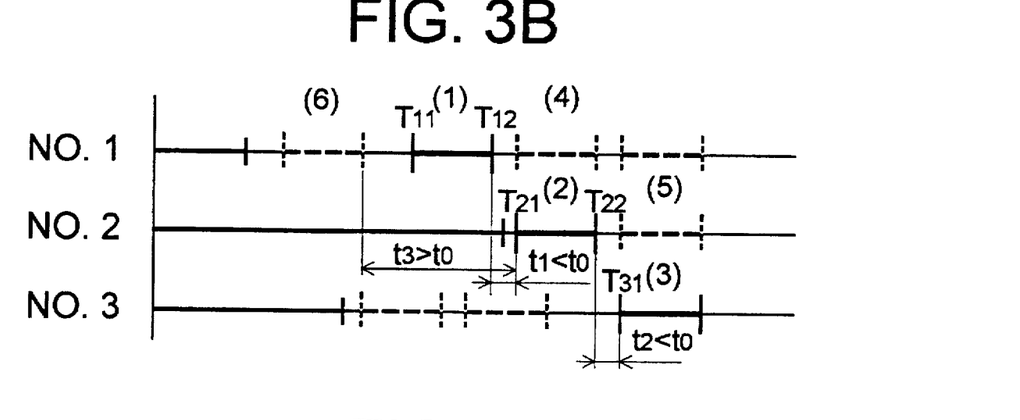

The method for making the reservation for the starting job implemented by the starting job reserving unit 5 will be explained with reference to FIGS. 3A through 3C. FIG. 3A shows a state of the starting job reservation table storage unit 4 before reference is made and shows a state of reservations of operations No. 1 through No. 3 executed by each piece of equipment. The horizontal axis represents time and the left edge thereof represents the current time. Work No. 1 is currently under operation and becomes idle the earliest among works 1–3. Work No. 2 is also under operation and the equipment is released latest. Work No. 3 becomes idle at a time between 1 and 2. Assume now that a pre-engagement lot, which is an object of the starting job reserving unit 5, is scheduled to undergo the works No. 1 through No. 3 as consecutive works and that there is a leave-over time limit intrinsic to that lot between each work, requiring the ensuing work to be started within the leave-over time limit $t_0$. Then, in this case, the starting times which can be set among works No. 1 through No. 3 altogether are starting times $T_{11}$ through $T_{31}$ shown in time zones (1) through (3) in FIG. 3B.

That is, because work No. 2 becomes idle latest, the work starting time $T_{21}$ of work No. 2 is set right after the idle time begins (the time zone (2)). Then, work No. 2 has to be started before the leave-over time limit $t_0$ elapses after the end of work No. 1. Accordingly, work ending time $T_{12}$ of work No. 1 is set at $T_{21}-t_1$ ($t_1 < t_0$) and the work starting time $T_{11}$ of work No. 1 is decided taking account of a necessary time of work No. 1 (the time zone (1)). Because work No. 3 also has to be started before the leave-over time limit $t_0$ elapses after the work ending time $T_{22}$ of work No. 2, it is started at $T_{22}-t_{2=T31}$ (the time zone (3)).

Figure 6:
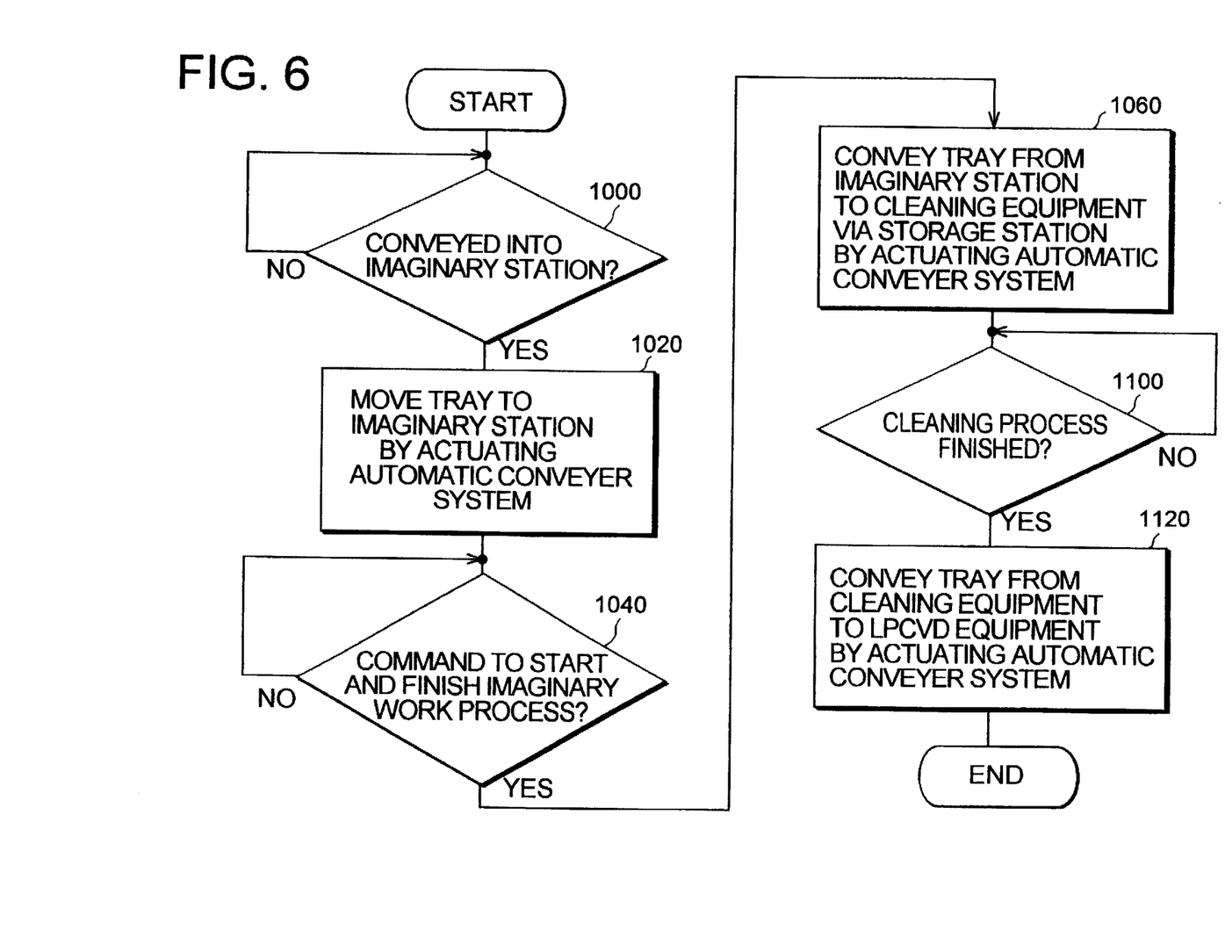
FIG. 6 is a flowchart showing a processing procedure of a main CPU (host computer) in the system of the second embodiment.

If the starting time of work No. 1 is set in a time zone (6) in FIG. 6, for example, as the idle time of the work No. 1 begins at the earlier time as shown in FIG. 3A, the work No. 2 which has to be implemented in succession is started after $t_3$ ($>t_0$), exceeding the leave-over time limit. As a result, the reservations table becomes as shown in FIG. 3C, when the starting job reservation for the pre-engagement lot requiring consecutive operations of works No. 1 through No. 3 has been written into this table.

Figure 3C:
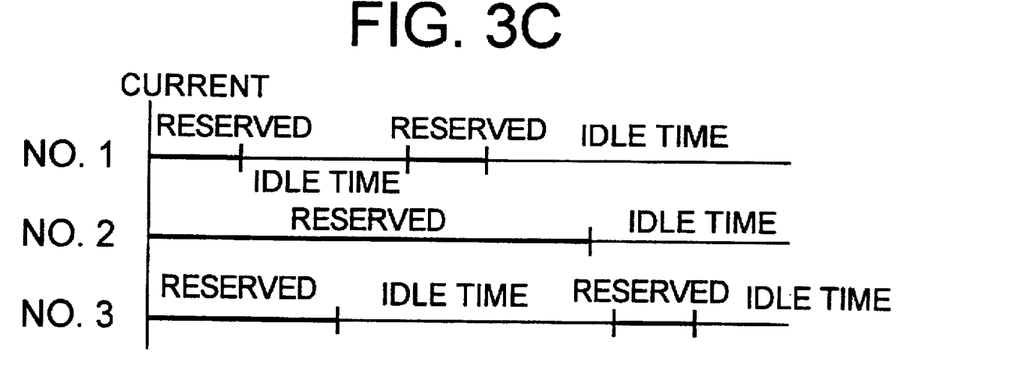

Then, when a next pre-engagement lot which is an object of the determination also requires works No. 1 and No. 2, starting times are decided based on the state of reservations in FIG. 3C after deciding processing conditions of each equipment for that lot. That is, because work No. 2 is idle during a time zone (5) shown in FIG. 3B and work No. 2 will be started in this time zone, the starting time of the work No. 1 will be set in a time zone (4), and the time zone (6) is inadequate.

However, when another pre-engagement lot requires only the work No. 1, the starting time can be set within the time zone (6), provided that a work time thereof fits in the period of the idle time of the work No. 1. It is noted that because the work time of each equipment is almost fixed per each equipment, it is possible, in many cases, to determine in advance whether it is an idle time which can be a time zone during which some lot can be started. For example, because the work reservation in the time zone (2) leaves only a short time between the time already reserved up to then in work No. 2, the short time cannot be an idle time and the time until the work ending time $T_{22}$ of the work reservation in (2) is considered as being reserved.

Thus, the starting job reservation table storage unit 4 stores a set of reservation information with respect to a lot identification, work starting time, work ending time, recipe name used and the like for each piece of equipment when a description of consecutive works having a leave-over time limit exists within the information of the process flow stored in the process flow storage unit 1. Then, the starting job reserving unit 5 selects a pre-engagement lot from the data in the starting job reservation table storage unit 4 by the lot progress control unit 2, finds out whether the works of the pre-engagement lot are consecutive processes or not from the process flow storage unit 1 and when they are consecutive processes, reads the time limit, equipment used and recipe name used.

The present invention retrieves an idle time of a first equipment used for a first operation and an idle time of a second equipment used for a second operation from the starting job reservation table storage unit 4, calculates a work starting time and a work ending time with respect to the first and second operations, respectively, so as not to exceed the leave-over time limit and adds the reservations to the starting job reservation table storage unit 4. Even when there are more than two consecutive operations, they are scheduled so as not to exceed all of leave-over time limits in the same manner. When an amount of a lot is such a great volume that the lot cannot be handled by a single ensuing operation, a reservation is made so as not to exceed the leave-over time limit by automatically limiting an amount to be processed in the preceding operation and by dividing the great amount of the lot into sub-lots.

Figure 2:
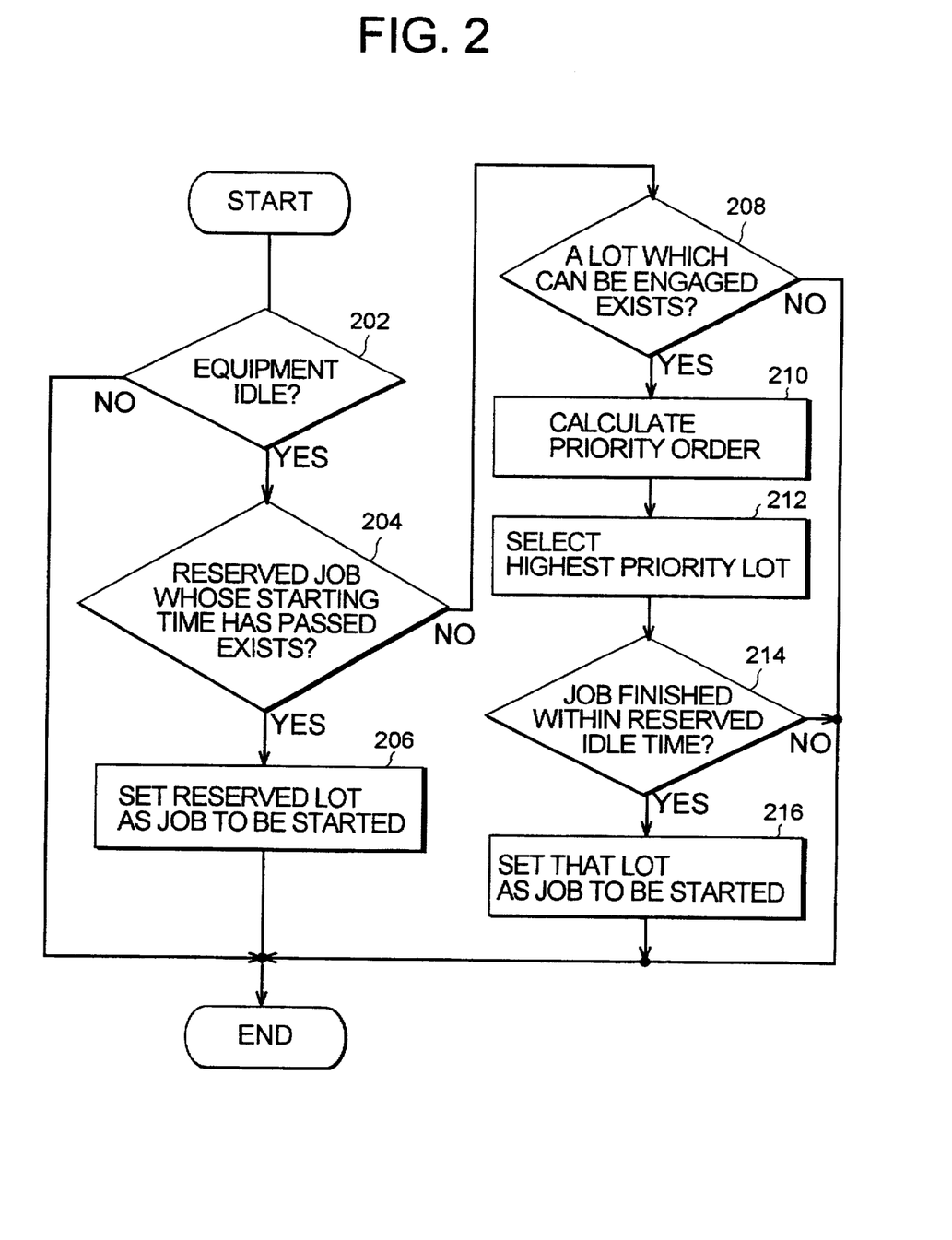
FIG. 2 is a flowchart showing the operation of starting job calculator.

Next, the operation of the starting job calculating unit 6 will be explained with reference to a flowchart shown in FIG. 2. The starting job calculating unit 6 specifies a pre-engagement lot to be started to each equipment and causes it to start to work and the program shown in FIG. 2 is executed by timer interruption per predetermined time.

In Step 202, all usable equipment whose work has been finished are checked orderly by making reference to the equipment operating information storage unit 3, and if all the equipment are not idle yet, the check is finished and is restarted after a predetermined time. If any piece of equipment is idle, it is checked in Step 204 whether a pre-engagement lot for the appropriate equipment exists therein by retrieving the starting job reservation table storage unit 4. When a reserved pre-engagement lot exists and when the current time at the time of the check has passed a work starting time scheduled for that pre-engagement lot, the work of that pre-engagement lot is decided as a job to be started, the appropriate equipment is instructed to start the job and the program in the starting job calculating unit 6 is finished in Step 206. It is noted that a case in which the reserved time has passed occurs because the starting job calculating unit 6 calculates for each predetermined time and it is not always possible to check and calculate just at the starting time.

When there is no lot whose reserved time has passed in the starting job reservation table storage unit 4, no reserved pre-engagement lot can be started, so that other pre-engagement lots for the equipment currently at issue are retrieved by the lot progress control unit 2 in Step 208. If there is one, their priority order is calculated in Step 210 and the highest priority lot is selected in Step 212. In Step 214, it is determined whether that lot can be processed or not within a range of idle time in the starting job reservation table storage unit 4. If it is possible to be processed, the work of that lot is decided as a job to be started, a corresponding equipment among the various equipment 15 is instructed to start the job and the process ends in Step 216. The starting job calculating unit 6 is then put into a standby state until it is periodically restarted. Because there is a possibility that a reserved pre-engagement lot is given a priority when the work of the appropriate lot cannot be finished within the idle time in Step 214, the starting job calculating unit 6 waits until the next check and ends the program. It is noted that Step 208 and the steps thereafter correspond to the conventional dispatching. When there exists no appropriate lot in Step 208, the program is finished without processing anything and waits for a start of calculation of next job to be started.

The operation of the starting job calculating unit 6 is implemented always or periodically by the timer interruption and is implemented for each equipment and its pre-engagement lot without exception. Art equipment whose job to be started is normally engaged for a while and, therefore, no job to be started needs to be decided. As a result, there is no work delays at all the equipment during each timer interruption. While the operation of the starting job calculating unit 6 is implemented by executing the program, it takes time for retrieval and the like if there is a lot of items to be processed. Accordingly, it is desirable to restart the program after finishing it in the case of the flowchart shown in FIG. 2. Because the implementation of the starting job calculating unit 6 is independent of the operation of the starting job reserving unit 5, a reference is made always to the starting job reservation table storage unit 4 currently prepared.

According to the structure of the present invention, the starting job calculating unit 6 calculates based on the starting job reservation table storage unit 4, so that in a first operation and a consecutive ensuing second operation, it becomes possible to prevent a lot having a volume that exceeds a capacity of the second work (equipment) from being processed in the first work. Similarly, it becomes possible to prevent a lot having a volume that cannot be processed in a batch simultaneously by the second work, exceeding a leave-over time limit, from being processed in the first work. Further, it becomes possible to avoid such trouble from occurring wherein a third lot is processed by the second work when the first work is processed and the second work is not open when the first work is finished.

Further, according to the present embodiment, the first and second works can be deemed consecutive works by the starting job reserving unit 5, so that the lot conveyer system need not to take a route for conveying the lot from the first work machine to an automatic storage shelf and from the automatic storage shelf to the second work machine. Instead, the lot can be conveyed directly from the first work machine to the second work machine, improving the efficiency of the conveyer system.

Figure 4:
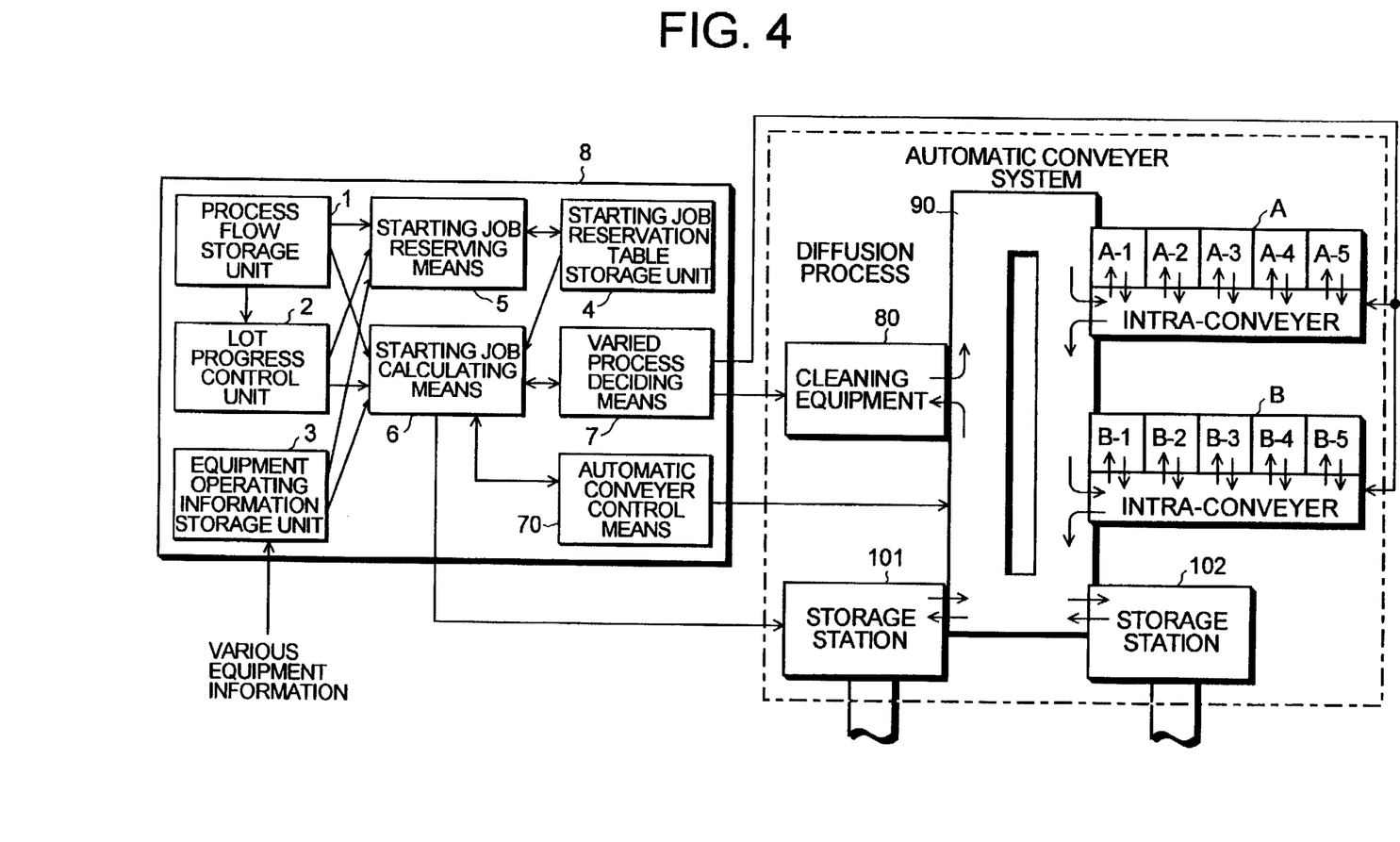
FIG. 4 is a schematic structural diagram for explaining a first embodiment of the present invention applied to a diffusion process.

The production control system accompanying the consecutive works described above may be realized concretely as follows. For example, a cleaning and thermal diffusion processes in a diffusion process of semiconductor wafers (substrates) as shown in FIG. 4 can be the consecutive first and second works.

In the diffusion process, semiconductor wafers are conveyed from a station (automatic storage shelf) 101 in which plural types of semiconductor wafers are stored to cleaning equipment (first processing equipment) 80 per each lot of the same type by an automatic conveyer system 90.

In cleaning equipment 80, predetermined cleaning works are implemented to each conveyed lot one by one under processing conditions corresponding to the type of each lot. After finishing the cleaning work, each processed lot is conveyed to each intra-equipment automatic conveyer system within a diffusion equipment A or diffusion equipment B (second processing equipment) by the automatic conveyer system 90 and is put into any one of predetermined furnaces A-1 through A-5 or furnaces B-1 through B-5 to implement thermal diffusion. At this time, the processing conditions for each type of lot described above have been set for each of the furnaces A-1 through A-5 or B-1 through B-5 and each processed lot is put into the predetermined furnace based on the type thereof to be processed. Accordingly, because the processed lot which can be appropriately processed by each furnace is put into each furnace, the predetermined thermal diffusion process per type can be performed efficiently in parallel.

After finishing the thermal diffusion, the lot is stored in a station (automatic storage shelf) 102 again by the automatic conveyer system 90. It is noted that although an automatic carrier (not shown) may be used in conveying the lot by the automatic conveyer system 90 to enable the consecutive processing operations, it is also possible to use a conveyer system which is directly connected with an overhead traveling automatic carrier.

In the thermal diffusion process, because an upper limit value of waiting time from the time when the cleaning work has been finished in cleaning equipment 80 to the time when the thermal diffusion work is started in the diffusion equipment A or B is defined, i.e. a leave-over time which is permissible for the deterioration is limited per each item whose cleaning has been completed, the thermal diffusion work is for that item within this leave- over time limit. Further, by the time when the works of the lot scheduled to be engaged are started at the cleaning equipment 80 and at the predetermined furnace in the diffusion equipment A or B, the processing conditions corresponding to the type of the lot scheduled to be engaged are decided in the cleaning equipment 80 and the predetermined furnace in the diffusion equipment A or B. Accordingly, the cleaning and thermal diffusion works of the lot scheduled to be engaged are carried out consecutively and efficiently on the basis of the processing conditions suited appropriately for that type thereof.

Thus, the desirable work starting timing is calculated for the lot to be engaged in the cleaning equipment 80 and the conditions suited for the type of the pre-engagement lot are decided for each equipment. The production of the semiconductor wafers in the diffusion process is controlled based on them.

The work starting timing described above is calculated concretely as follows.

It is noted that first, second, third and fourth reserving units described below are all contained in the starting job reserving unit 5. Further, the pre-engagement lot scheduled to undergo the predetermined processes in the cleaning and thermal diffusion processes exists in the station 101 and the predetermined processing conditions corresponding to the type of the pre-engagement lot are determined appropriately for the cleaning equipment 80 and for the diffusion equipment A or B by the varied equipment condition setting unit 7.

When the equipment operating information storage unit 3 detects idle states of the cleaning equipment 80 and the diffusion equipment A or B, the first reserving unit starts to calculate a scheduled work starting time of the cleaning equipment 80 for each lot based on a scheduled lot conveying time of the automatic conveyer system 90 from the storage station 101 to the cleaning equipment 80 and stores it as first reservation information in the starting job reservation table storage unit 4.

Next, the second reserving unit calculates a scheduled work ending time of the cleaning equipment 80 based on the first reservation information of the first reserving unit and a scheduled cleaning time of one cycle of the cleaning equipment 80 under the predetermined processing conditions decided by the varied processing condition setting unit 7 and stores the work ending time as second reservation information in the starting job reservation table storage unit 4.

Then, the third reserving unit calculates a scheduled work starting time of the diffusion equipment A or B so that the waiting time of each lot is kept within the leave-over time limit based on the second reservation information of the second reserving unit and a scheduled lot conveying time of the automatic conveyer system 90 necessary for conveying from the cleaning equipment 80 to the diffusion equipment A or B and stores the starting time as third reservation information in the starting job reservation table storage unit 4.

Further, the fourth reserving unit calculates a scheduled work ending time of the diffusion equipment A or B based on the third reservation information of the third reserving unit and a scheduled diffusion time of one cycle of the diffusion equipment A or B under the predetermined conditions decided by the varied processing condition setting unit 7 and stores the ending time as fourth reservation information in the starting job reservation table storage unit 4.

Thus, the lot is conveyed from the storage station 101 to the cleaning equipment 80 based on the first reservation information, second reservation information, third reservation information and fourth reservation information in the starting job reservation table storage unit 4.

By the way, all the semiconductor wafers stored in the storage station 101 are not always put into the diffusion equipment A or B after completing the cleaning. That is, after completing the cleaning, some lots may be conveyed to equipment (e.g. a vapor deposition equipment 28 shown in FIG. 7) other than the diffusion equipment A or B.

In this case, the starting job reserving unit 5 determines for each lot stored in the storage station 101 whether they are scheduled to undergo the consecutive works in the diffusion process or not and controls the production of the lots scheduled to undergo the consecutive works in the diffusion process. It is noted that the best timing for carrying out the determination is when the pre-engagement lot arrives at the cleaning equipment 80.

There is also a case when the cleaning equipment 80 is stopped due to a periodic replacement of cleaning fluid thereof, due to cleaning of a lot to be conveyed to an equipment other than the diffusion equipment A or B, or due to an abrupt failure which can be recovered in a short time, etc. Similarly, there is a case when the conveying operation in the diffusion process is stopped, i.e. a case in which a lot scheduled to be conveyed to the diffusion equipment A or B is not conveyed, also in the automatic conveyer system 90 due to a conveyance of a lot to be conveyed to equipment other than the diffusion equipment A or B or due to an abrupt failure which can be recovered in a short time. When each equipment is thus stopped, a lag is generated between each scheduled work starting time and each scheduled work ending time reserved and stored in advance in the production control system and an actual lot flowing timing. Other than such lag, a physical lag may be also generated with respect to the processing time of each equipment.

With regard to such lag of the lot flowing timing, according to the present embodiment, the varied processing condition setting unit 7 detects the lag, and adequate scheduled work starting time and scheduled work ending time are calculated again, the memory is updated and a work starting timing is calculate anew for a lot to be conveyed to the diffusion process next at the point of time when the lag has been generated by the starting job reserving unit 5, the starting job reservation table storage unit 4 and the starting job calculating unit 6. Accordingly, the latest pre-engagement lot is adequately conveyed even if a lag has been generated, so that the production of lot is implemented steadily and efficiently within the leave-over time limit.

As described above, an efficient work starting timing fully exhibiting the capacity can be taken for each lot within the leave-over time limit thereof.

It is noted that the cleaning and thermal diffusion processes in the diffusion process of semiconductor wafers have been illustrated as the consecutive first and second works in FIG. 4, the present embodiment is not confined to that and various modifications can be made without departing the scope and spirit of the first embodiment.

For example, instead of the diffusion process shown in FIG. 4, the consecutive first and second works may be cleaning and thin film forming (film deposition) processes in a thin film deposition process of semiconductor wafers. Because things are basically the same except of that the diffusion equipment A or B is replaced with a thin film deposition equipment, a detailed explanation thereof will be omitted here.

Further, although the flow of lots has been explained with respect to one cleaning equipment and two diffusion equipments, the number of respective equipment can be more than that and in such case also, scheduled work starting and ending times are calculated for all the equipment, stored as reservation information and a work starting timing of a pre-engagement lot is adequately calculated.

[Second Embodiment]

A second preferred embodiment of the present invention will be explained below with reference to FIG. 5.

It is noted that the same reference numerals identify parts having the same structure as those described in the first embodiment and an explanation thereof will be omitted.

Figure 5:
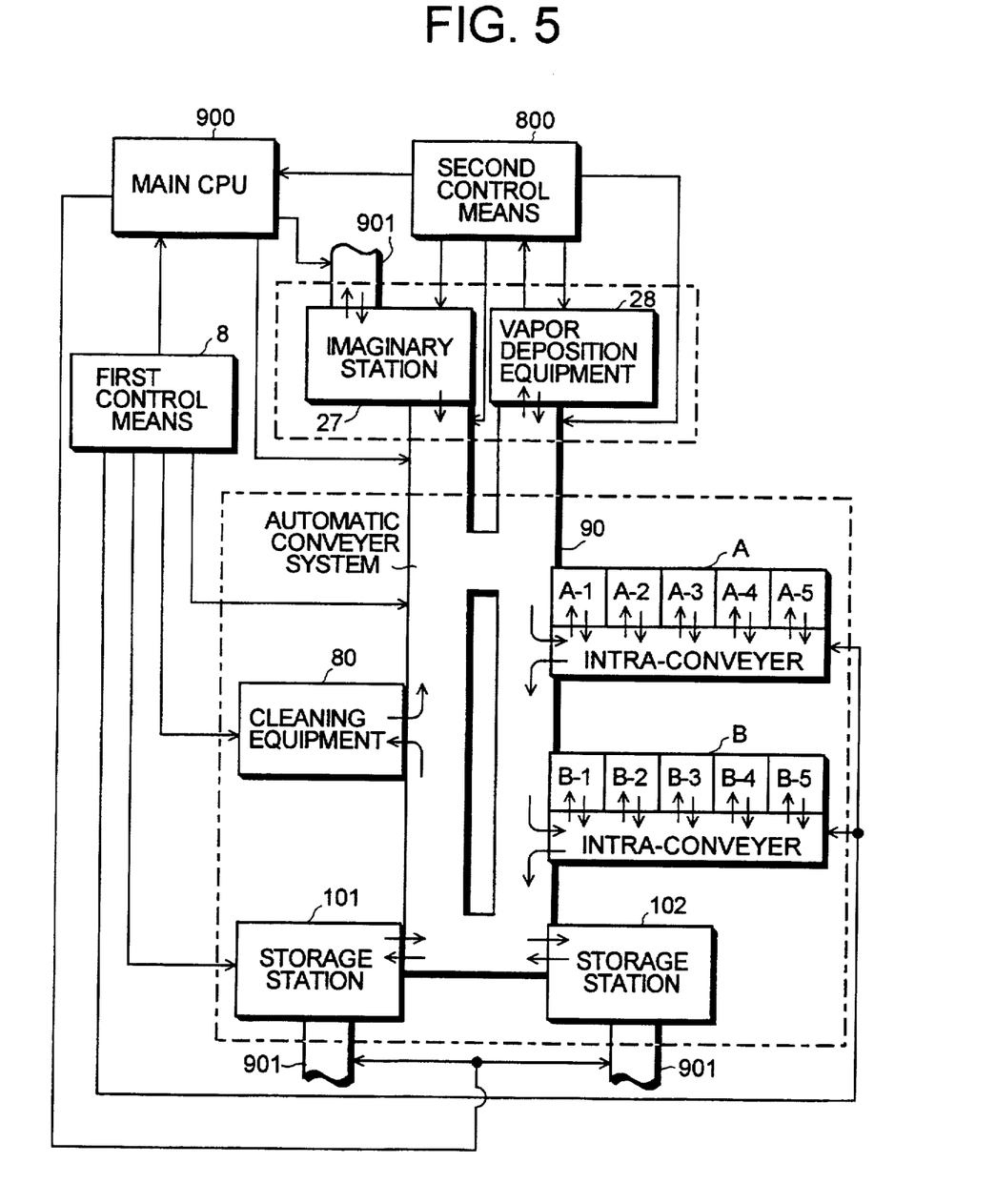
FIG. 5 is a structural diagram illustrating a whole structure of a work line system with respect to a second embodiment of the present invention.

FIG. 5 shows a production line in which the thin film deposition process is added to the diffusion process. In particular, it comprises, in addition to the first control unit 8 and the diffusion process, second control unit 800, the thin film deposition process comprising a (low pressure chemical) vapor deposition equipment (hereinafter referred to also as the LPCVD equipment) 28 (a third processing equipment) and an imaginary station 27, and a main CPU (host computer) 900.

The cleaning equipment 80 and the diffusion equipment A and B are controlled by the first control unit 8 and the imaginary station 27 and the vapor deposition equipment 28 are controlled by the second control unit 800. First and second control units 8 and 800 are independent of one another.

The structure of the second embodiment may be summarized as being a manufacturing process in which a processed lot has a leave-over time limit within which its level of deterioration is with permissible amounts after completion of a first work (cleaning work) similarly to the first embodiment and a third work (vapor deposition work) different from a second work (thermal diffusion work) is carried out in succession, commonly using the first work.

The main CPU 900 is equipped with a RAM (not shown) in which data of a work process flow in an order of an imaginary work process in the imaginary station 27, the cleaning process in the cleaning equipment 80 and a vapor deposition process in the vapor deposition equipment 28 is stored and controls mainly an automatic conveyer system 901 conveying each lot between the diffusion process and the thin film deposition process. It also always monitors states of control of the first control unit 8 and the second control unit 800 in each process and stores main information.

The vapor deposition equipment 28 implements predetermined vapor deposition on every processed lot which has been conveyed from the imaginary station 27 and whose predetermined cleaning work has been completed in the cleaning equipment 80 per type in parallel under processing conditions set per type of each processed lot within a waiting time during which the retention of the lot will not exceed the limit time.

The imaginary station 27 is equipment which functions as a buffer. Each lot scheduled to be conveyed into the cleaning equipment 80 is conveyed to the storage station 101 once by the main CPU 900.

The second control unit 800 controls operations of the equipment, such as installation of semiconductor wafers in the vapor deposition equipment 28, actuation of the equipment and notification of the start and end of the vapor deposition to the main CPU 900. It also controls various things, such as monitoring of a processing state of the vapor deposition equipment 28, outputting a command to start to convey a lot scheduled to be conveyed into the cleaning equipment 80 from the imaginary station 27 corresponding to that processing state to control a timing to convey the pertinent lot into the cleaning equipment 80 in accordance to that command, and control of intra-process conveying operation for conveying the lot out of the imaginary station 27 and for conveying in and out of the vapor deposition equipment 28. Each lot scheduled to be conveyed is conveyed to the storage station 101 once under the control of the second control unit 800 and is put into the cleaning equipment 80 and then to the vapor deposition equipment 28 by the first control unit 8.

That is, when the imaginary station 27 receives the command to start the conveyance input with a predetermined timing corresponding to the operating state of the vapor deposition equipment 28 from the second control unit 800, each lot of the semiconductor wafers is adequately conveyed and controlled in an order of the imaginary station 27, the storage station 101, the cleaning equipment 80 and the vapor deposition equipment 28.

A processing procedure in the second embodiment will be explained below based on a flowchart shown in FIG. 6.

The second control unit 800 commands the imaginary station 27 to convey a tray carrying wafers, which is an object (hereinafter referred to simply as "tray"), into the imaginary station 27. The main CPU 900 determines in Step 1000 whether the conveyance command has been given or not and when it has been in fact given, actuates the automatic conveyer system 901 in Step 1020 to convey the tray to the imaginary station 27.

Next, the second control unit 800 commands the imaginary station 27 to start an imaginary work process with a predetermined timing. This timing (engaging timing) is set about at (scheduled processing ending time of the LPCVD equipment 28)−{(time necessary for the function of the imaginary station 27 (because it is actually a dummy imaginary process, the necessary time of each lot may be set as zero))+2(conveying time between each process and in each process)+(cleaning time by the cleaning equipment 80)}. By setting as described above, the process of the LPCVD equipment 28 is completed and the next process may be carried out by the time when the tray set in the imaginary station 27 and cleaned in the cleaning equipment 80 comes back to the LPCVD equipment 28.

When it is determined in Step 1040 that the second control unit 800 has given a command to start and finish the imaginary work process of the imaginary station 27, the automatic conveyer system 90 is actuated to convey the tray from the imaginary station 27 to the storage station 101 once in Step 1060. The reason why the tray is conveyed immediately in Step 1060 when the command to start and finish the imaginary work process is given by the second control unit 800 in Step 1040 is because no work is carried out actually in the imaginary work process as it is a dummy process. Then, the tray is automatically set in the cleaning equipment 80 by the process in Step 1060 and the cleaning equipment 80 is actuated under the control of the first control unit 8 to clean the semiconductor wafers provided on the tray.

After completing the automatic cleaning by means of the cleaning equipment 80, the first control unit 8 sends a signal to the main CPU 900. When the main CPU 900 judges that this signal has been input in Step 1100, it drives the automatic conveyer system 90 to take out the tray whose cleaning has been completed from the cleaning equipment 80 and sets that tray in the LPCVD equipment 28 in Step 1120. When the LPCVD equipment 28 is out of order or is under repair for instance, the second control unit 800 gives the command to start the imaginary work process at (scheduled time when the repair of the LPCVD equipment 28 is completed and it can be used normally (operable again))−{time necessary for the function of the imaginary station 27 (because it is actually a dummy imaginary process, the necessary time may be set as zero))+2 (conveying time between each process and in each process) +(cleaning time by the cleaning equipment 80)}.

Thereby, by the scheduled time when the repair of the LPCVD equipment 28 is completed and it can be used normally, the tray on which the semiconductor wafers whose cleaning has been completed by the cleaning equipment 80 may be set in the LPCVD equipment 28 immediately.

As described above, the time when the tray carrying the semiconductor wafers which has been conveyed once into the storage station 101 and has undergone the cleaning process by the cleaning equipment 80 is set in the LPCVD equipment 28 may be controlled by varying the starting timing (engaging timing) of the imaginary work process in the imaginary station 27 by the second control unit 800. As a result, it becomes possible to prevent a number of trays from being accumulated before being set in the LPCVD equipment 28 and after the cleaning, the vapor deposition of the semiconductor wafers can be started immediately by the LPCVD equipment 28, thus improving the quality of the vapor deposition layer.

It is noted that when a lot scheduled to be conveyed into the vapor deposition equipment 28 and a lot scheduled to be conveyed into the diffusion equipment A or B are conveyed into the cleaning equipment 80 in the same time, both lots are compared by the first control unit 8 and the lot having a higher priority order is given the priority based on the predetermined priority order set in advance and undergoes the predetermined process in the cleaning equipment 80. Accordingly, no delay which might be otherwise caused when the conveyed lots overlap each other nor no trouble such as a stoppage of the equipment is caused.

The priority order of the lots scheduled to be conveyed is set as follows. A time limit is set between the imaginary station 27 and the cleaning equipment 80 for the lot scheduled to be conveyed into the vapor deposition equipment 28. Thereby, the priority order of the lot scheduled to be conveyed into the vapor deposition equipment 28 can be higher than that of the lot scheduled to be conveyed into the diffusion equipment A or B and among the lots scheduled to be conveyed into the cleaning equipment 80, the one conveyed to the vapor deposition equipment 28 is given the priority and is processed first.

As described above, the main CPU 900 only monitors and stores the state of control of each control unit such as the first control unit 8 and the second control unit 800 which control each process, not controlling each work of each process directly, and controls mainly the automatic conveyer system 901 between each process, so that the system design of the semiconductor wafer production line comprising a great variety of processes and which is required to process plural types and plural lots of semiconductor wafers arbitrarily can be relatively simple and the efficiency of the design work can be improved. Further, the burden of the main CPU 900 can be reduced.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor substrate production control system comprising:

first control unit controlling a progress of production of a plurality of types of semiconductor substrates in a per lot basis and controlling various processing equipment;

a storage station for storing said lots of said semiconductor substrates;

first processing equipment for implementing a predetermined process under a processing condition corresponding to a type of lot to be operated on by said first processing equipment;

second processing equipment for processing a lot in parallel with said first processing equipment based on said type of said lot under a processing condition set according to said type of said lot to be operated on by said second processing equipment; and a conveyor conveying said lots from said storage station to said first processing equipment, from said first processing equipment to said second processing equipment and from said second processing equipment, wherein said first control unit comprises:

a memory;

processing condition setting unit for setting said processing conditions of said first and said second processing equipment based on said type of lot scheduled to be conveyed from said storage station to an associated one of said first and said second processing equipment;

a reserving unit for calculating, based on at least a lot conveying time of said conveyer and a processing ending time of said second processing equipment for a previous lot calculated based on said processing condition set by said setting unit, a processing starting time and a processing ending time of said first processing equipment and a processing starting time and a processing ending time of said second processing equipment for a particular lot scheduled to be conveyed so that a leave-over time during which said lot is between processing operations is kept within a time limit in which a level of deterioration of said lot is within permissible levels, and for storing said starting and said ending times in said memory as reservation information; and a conveyor controller causing said conveyor, based on said reservation information stored in said memory, to transport said particular lot from said storage station to said first processing equipment.

2. A semiconductor substrate production control system according to claim 1, further comprising a detecting unit that monitors operating states of said first processing equipment and said second processing equipment, wherein said reserving unit comprises:

a first reserving unit for calculating a work starting time of said first processing equipment based on a lot conveying time of said first conveyor from said storage station to said first processing equipment and based on a determination that said detecting unit detects that both of said first and said second processing equipment are in a state capable of processing a lot, and for storing said work starting time calculated by said first reserving unit as first reservation information in said memory;

a second reserving unit for calculating a work ending time of said first processing equipment based on said first reservation information and a processing time of one cycle of said first processing equipment under said predetermined processing conditions set by said setting unit and for storing said work ending time calculated by said second reserving unit as second reservation information in said memory;

a third reserving unit for calculating a work starting time of said second processing equipment so that said leave-over time is kept within said time limit based on said second reservation information and a lot conveying time of said conveyor necessary for conveying said lot from said first processing equipment to said second processing equipment and for storing said work starting time calculated by said third reserving unit as third reservation information in said memory; and a fourth reserving unit for calculating a work ending time of said second processing equipment based on said third reservation information and a processing time of one cycle of said second processing equipment under said predetermined conditions set by said setting unit and for storing said work ending time calculated by said fourth reserving unit as fourth reservation information in said memory, whereby said lot is conveyed from said storage station to said first processing equipment based on said first reservation information, said second reservation information, said third reservation information and said fourth reservation information in said memory.

3. A semiconductor substrate production control system according to claim 1, further comprising:

a decision unit determining whether said lots stored in said storage station are scheduled to undergo processing in said second processing equipment;

wherein said reserving unit calculates each scheduled processing starting time and each scheduled processing ending time of said first processing equipment and said second processing equipment so that said leave-over time is kept within said time limit for a lot determined by said decision unit to be scheduled to be processed in said second processing equipment and stores said processing starting and ending times as reservation information, and said conveyer controller causing said lot scheduled to be processed in said second processing equipment to be conveyed from said storage station to said first processing equipment based on said reservation information.

4. A semiconductor substrate production control system according to claim 3, wherein for each lot, said determining conducted by said decision unit is carried out upon each lot entering a state to be processed by said first processing equipment.

5. A semiconductor substrate production control system according to claim 1, further comprising a calculating unit calculating a conveyance starting time of said lot scheduled to be conveyed from said storage station to said first processing equipment per every constant time interval based on said reservation information in said memory, wherein said conveyer controller controls said conveyer based on a calculation result of said calculating unit.

6. A semiconductor substrate production control system according to claim 1, wherein said first processing equipment is cleaning equipment and said second processing equipment is diffusion equipment.

7. A semiconductor substrate production control system according to claim 1, wherein said first processing equipment is cleaning equipment and said second processing equipment is film deposition equipment.

8. A semiconductor substrate production control system according to claim 1, further comprising:

a first station functioning as a buffer into which one of said lots is conveyed before said one of said lots is conveyed into said first processing equipment;

third processing equipment for implementing a predetermined process under processing conditions set for a lot processed in said first processing equipment based on said type of said lot;

a second control unit controlling operation of said third processing equipment and monitoring a processing state thereof, for calculating a timing for starting to convey said lot scheduled to be conveyed from said first station to said first processing equipment and determining processing conditions of said third processing equipment corresponding to a type of said lot scheduled to be conveyed to said third processing equipment and for controlling a lot conveying operation from said first station and a lot conveying operation from said first station and a lot conveying into and out of said third processing equipment; and a host computer for monitoring states of control of said second and said first control unit and corresponding to said state of control, controlling said lot conveying operations between said first processing equipment and said first station and between said first processing equipment and said third processing equipment.

9. A semiconductor substrate production control system according to claim 8, wherein a timing for commanding a start of said conveying operation is defined as follows:

processing ending time of said third processing equipment)−{(time allotted to processing by said first station)+2(time necessary for conveying said lot from said first station to said first processing equipment)+ time necessary for conveying said lot from said first processing equipment to said third processing equipment)+(cleaning time by said first processing equipment)}.

10. A semiconductor substrate production control system according to claim 8, wherein a timing for commanding a start of a conveying operation when said third processing equipment has temporarily stopped is defined as follows:

(scheduled time when said third processing equipment operates again)−{(time allotted to processing by said first station)+2(time necessary for conveying said lot from said imaginary station to said first processing equipment+time necessary for conveying said lot from said first processing equipment to said third processing equipment)+(cleaning time by said first processing equipment)}.

11. A semiconductor substrate production control system according to claim 8, wherein said third processing equipment is vapor deposition equipment.

12. A semiconductor substrate production control system according to claim 8, wherein, responsive to a lot scheduled to be conveyed into said third processing equipment and a lot scheduled to be conveyed into said second processing equipment are conveyed into said first processing equipment at same time, said first control unit compares priority information associated with both lots scheduled to be conveyed and instructs said first processing equipment to implement a processing operation on a lot having a higher priority based on a predetermined priority order set in advance.

13. A semiconductor substrate production control system according to claim 12, wherein said priority order of said lot scheduled to be conveyed into said third processing equipment is set higher than that said lot scheduled to be conveyed into said second processing equipment by setting a time limit from said first station to said first processing equipment for said lot scheduled to be conveyed into said third processing equipment.

14. A semiconductor substrate production control system comprising:

first control means for controlling a progress of production of a plurality of types of semiconductor substrates in a per lot basis and controlling various processing equipment;

a storage station for storing said lots of said semiconductor substrates;

first processing equipment for implementing a predetermined process under a processing condition corresponding to a type of lot to be operated on by said first processing equipment;

second processing equipment for a lot in parallel with said first processing equipment based on said type of said lot under a processing condition set according to said type of said lot to be operated on by said second processing equipment; and a conveyor means for conveying said lots from said storage station to said first processing equipment, from said first processing equipment to said second processing equipment and from said second processing equipment, wherein said first control means comprises:
  storage means;
  deciding means setting said processing conditions of said first and said second processing equipment based on said type of lot scheduled to be conveyed from said storage station to an associated one of said first and said second processing equipment;
  reserving means for calculating, based on at least a lot conveying time of said conveyer means and a processing ending time of said second processing equipment for a previous lot calculated based on said processing condition set by said deciding means, a processing starting time and a processing ending time of said first processing equipment and a processing starting time and a processing ending time of said second processing equipment for a particular lot scheduled to be conveyed so that a leave-over time during which said lot is between processing operations is kept within a time limit in which a level of deterioration of said lot is within permissible levels, and for storing said starting and said ending times in said storage means as reservation information; and
  conveyor control means causing said conveyor, based on said reservation information stored in said storage means, to transport said particular lot scheduled to be conveyed from said storage station to said first processing equipment and for controlling a conveying operation of said conveyor means.

15. A semiconductor substrate production control system according to claim 14, further comprising detecting means for detecting operating states of said first processing equipment and said second processing equipment, wherein said reserving means comprises:

first reserving means for calculating a work starting time of said first processing equipment based on a lot conveying time of said conveying means from said storage station to said first processing equipment and based on a determination that said detecting means detects that both of said first and said second processing equipment are in a state capable of processing a lot, and for storing said work starting time calculated by said first reserving unit as first reservation information in said storage means;

second reserving means for calculating a work ending time of said first processing equipment based on said first reservation information of said first reserving means and a processing time of one cycle of said first processing equipment under said predetermined processing conditions set by said deciding means and for storing said work ending time calculated by said second reserving unit as second reservation information in said storage means;

third reserving means for calculating a work starting time of said second processing equipment so that said leave-over time is kept within said time limit based on said second reservation information of said second reserving means and a lot conveying time of said conveying means necessary for conveying said lot from said first processing equipment to said second processing equipment and for storing said work starting time calculated by said third reserving unit as third reservation information in said storage means; and fourth reserving means for calculating a work ending time of said second processing equipment based on said third reservation information of said third reserving means and a processing time of one cycle of said second processing equipment under said predetermined conditions set by said deciding means and for storing said work ending time calculated by said fourth reserving unit as fourth reservation information in said storage means, whereby said lot scheduled to be conveyed is conveyed from said storage station to said first processing equipment based on said first reservation information, said second reservation information, said third reservation information and said fourth reservation information in said storage means.

16. A semiconductor substrate production control system according to claim 14, further comprising:

determining means for determining whether said lots stored in said storage station are scheduled to undergo processing in said second processing equipment;

wherein said reserving means calculates each scheduled processing starting time and each scheduled processing ending time of said first processing equipment and said second processing equipment so that said leave-over time is kept within said time limit for a lot determined by said determining means to be scheduled to be processed in said second processing equipment and stores said processing starting and ending times as reservation information, and said conveyer control means causes said lot scheduled to be processed in said second processing equipment to be conveyed from said storage station to said first processing equipment based on said reservation information and controls the conveying operation of said conveying means.

17. A semiconductor substrate production control system according to claim 16, wherein for each lot, said determining conducted by said determining means is carried out upon each lot entering a state to be processed by said first processing equipment.

18. A semiconductor substrate production control system according to claim 14, further comprising a calculating means for calculating a conveyance starting time of said lot scheduled to be conveyed from said storage station to said first processing equipment per every constant time interval based on said reservation information in said storage means, wherein said conveyer control means control said conveyer based on a calculation result of said calculating means.

19. A semiconductor substrate production control system according to claim 14, wherein said first processing equipment is cleaning equipment and said second processing equipment is diffusion equipment.

20. A semiconductor substrate system according to control system according to claim 14, wherein said first processing equipment is cleaning equipment and said second processing equipment is film deposition equipment.

21. A semiconductor substrate production control system according to claim 14, further comprising:

a first station functioning as a buffer into which one of said lots is conveyed before said one of said lots is conveyed into said first processing equipment;

third processing equipment for implementing a predetermined process under processing conditions set for a lot processed in said first processing equipment based on said type of said lot;

second control means for controlling operation of said third processing equipment and monitoring a processing state thereof, for calculating a timing for starting to convey said lot scheduled to be conveyed from said first station to said first processing equipment and determining processing conditions of said third processing equipment corresponding to a type of said lot scheduled to be conveyed to said third processing equipment and for controlling a lot conveying operation from said first station and a lot conveying operation from said first station and a lot into and out of said third processing equipment; and a host computer for monitoring states of control of said second and said first control means and corresponding to said state of control, controlling said lot conveying operations between said first processing equipment and said first station and between said first processing equipment and said third processing equipment.

22. A semiconductor substrate production control system according to claim 21, wherein a timing commanding a start of said conveying operation is defined as follows:

processing ending time of said third processing equipment)−{(time allotted to processing by said first station)+2(time necessary for conveying said lot from said first station to said first processing equipment)+ time necessary for conveying said lot from said first processing equipment to said third processing equipment)+(cleaning time by said first processing equipment)}.

23. A semiconductor substrate production control system according to claim 21, wherein a timing commanding a start of a conveying operation when said third processing equipment has temporarily stopped is defined as follows:

(scheduled time when said third processing equipment operates again)−{(time allotted to processing by said first station)+2(time necessary for conveying said lot from said imaginary station to said first processing equipment+time necessary for conveying said lot from said first processing equipment to said third processing equipment)+(cleaning time by said first processing equipment)}.

24. A semiconductor substrate production control system according to claim 21, wherein said third processing equipment is vapor deposition equipment.

25. A semiconductor substrate production control system according to claim 21, wherein, responsive to a lot scheduled to be conveyed into said third processing equipment and a lot scheduled to be conveyed into said second processing equipment are conveyed into said first processing equipment at same time, said first control means compares priority information associated with both lots scheduled to be conveyed and instructs said first processing equipment to implement a processing operation on a lot having a higher priority based on a predetermined priority order set in advance.

26. A semiconductor substrate production control system according to claim 25, wherein said priority order of said lot scheduled to be conveyed into said third processing equipment is set higher than that said lot scheduled to be conveyed into said second processing equipment by setting a time limit from said first station to said first processing equipment for said lot scheduled to be conveyed into said third processing equipment.

* * * * *